US011137039B2

(12) United States Patent
Karpenman et al.

(10) Patent No.: US 11,137,039 B2
(45) Date of Patent: Oct. 5, 2021

(54) METHOD FOR CONTROLLING A CLUTCH ARRANGEMENT

(71) Applicant: VOLVO TRUCK CORPORATION, Gothenburg (SE)

(72) Inventors: Fredrik Karpenman, Västra Frölunda (SE); Anders Hedman, Marstrand (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 16/651,854

(22) PCT Filed: Oct. 11, 2017

(86) PCT No.: PCT/EP2017/075893
§ 371 (c)(1),
(2) Date: Mar. 27, 2020

(87) PCT Pub. No.: WO2019/072383
PCT Pub. Date: Apr. 18, 2019

(65) Prior Publication Data
US 2020/0248764 A1    Aug. 6, 2020

(51) Int. Cl.
*F16D 48/06*   (2006.01)
*F16D 48/08*   (2006.01)

(52) U.S. Cl.
CPC ........... *F16D 48/066* (2013.01); *F16D 48/08* (2013.01); *F16D 2500/108* (2013.01);
(Continued)

(58) Field of Classification Search
None
See application file for complete search history.

(56) References Cited

U.S. PATENT DOCUMENTS 5,337,866 A * 8/1994 Sturmer ............... F16D 48/066
192/103 R
5,562,190 A * 10/1996 McArthur ............ F16D 48/066
192/48.3
(Continued)

FOREIGN PATENT DOCUMENTS

CN    103180189 A    6/2013
CN    103573856 A    2/2014
(Continued)

OTHER PUBLICATIONS

China Office Action dated Feb. 10, 2021 in corresponding China Patent Application No. 201780095778.7, 16 pages.
(Continued)

*Primary Examiner* — Timothy Hannon
(74) *Attorney, Agent, or Firm* — Venable LLP; Jeffri A. Kaminski

(57) ABSTRACT

The present invention relates to a method for controlling a clutch arrangement (102) of a vehicle transmission (100) arranged within a gearbox housing (104) of a vehicle, the clutch arrangement being connected to a pneumatically controlled actuator arrangement (106) for controllably arrange the clutch arrangement between a closed position and an open position, wherein the vehicle transmission further comprises at least one rotatable transmission component (108, 108', 108") configured to assume an engaged state, a disengaged state and an at least partially engaged state. By means of the method, the rotatable transmission component is arranged to be positioned in the at least partially engaged state for increasing the heat within the gearbox housing.

13 Claims, 3 Drawing Sheets

(52) U.S. Cl.
CPC .............. *F16D 2500/1028* (2013.01); *F16D 2500/1045* (2013.01); *F16D 2500/10412* (2013.01); *F16D 2500/3166* (2013.01); *F16D 2500/3168* (2013.01); *F16D 2500/5014* (2013.01); *F16D 2500/50808* (2013.01); *F16D 2500/7041* (2013.01); *F16D 2500/70406* (2013.01)

(56) References Cited

U.S. PATENT DOCUMENTS

| | | | |
|---|---|---|---|
| 2006/0040789 A1 | 2/2006 | Katou et al. | |
| 2010/0081547 A1 | 4/2010 | Kobayashi et al. | |
| 2016/0116062 A1* | 4/2016 | Hedman | F16D 48/062 701/51 |
| 2019/0186562 A1* | 6/2019 | Ruchardt | F16D 48/06 |
| 2019/0186564 A1* | 6/2019 | Ruchardt | F16D 25/083 |

FOREIGN PATENT DOCUMENTS

| | | |
|---|---|---|
| CN | 103807325 A | 5/2014 |
| CN | 105156645 A | 12/2015 |
| CN | 106467115 A | 3/2017 |
| CN | 206130072 U | 4/2017 |
| CN | 107002829 A | 8/2017 |
| CN | 107035789 A | 8/2017 |
| DE | 2628486 A1 | 1/1977 |
| DE | 102013203593 A1 | 9/2014 |
| JP | 2015178311 A | 10/2015 |
| WO | 2007040404 A1 | 4/2007 |
| WO | 2011093787 A1 | 8/2011 |

OTHER PUBLICATIONS

International Search Report and Written Opinion dated Aug. 9, 2018 in corresponding International PCT Application No. PCT/EP2017/075893, 8 pages.

* cited by examiner

METHOD FOR CONTROLLING A CLUTCH ARRANGEMENT

CROSS REFERENCE TO RELATED APPLICATIONS

This application is a U.S. National Stage application of PCT/EP2017/075893, filed Oct. 11, 2017 and published on Apr. 18, 2019 as WO2019/072383A1, all of which is hereby incorporated by reference in its entirety.

TECHNICAL FIELD

The present invention relates to a method for controlling a clutch arrangement. The invention also relates to a gearbox system connected to a vehicle transmission for controlling a clutch arrangement. The invention is applicable on vehicles, in particularly low, medium and heavy duty vehicles commonly referred to as trucks. Although the invention will mainly be described in relation to a truck, it may also be applicable for other type of vehicles such as e.g. working machines, buses, etc.

BACKGROUND

In connection to controlling clutch arrangements such as clutches and brakes in a vehicle, in particular in a transmission arrangement of a vehicle, pneumatic or hydraulic systems are often utilized for opening and closing the clutch arrangements. Hereby, high pressure of compressed gas or high pressure hydraulic fluid is supplied to the clutch arrangement for opening and closing the clutch, i.e. if the clutch arrangement is normally opened, the fluid is supplied for closing thereof, and if the clutch arrangement is normally closed, the fluid is supplied for opening thereof.

Preferably, a valve arrangement or the like is used for controlling the flow of high pressurized compressed gas or high pressure hydraulic fluid. Thus, for a normally closed clutch arrangement the valve arrangement is opened when arranging the clutch arrangement from the closed position to the opened position. Likewise, the valve arrangement is opened when arranging a normally opened clutch arrangement from an opened position to a closed position.

When supplying e.g. high pressurized compressed gas for opening the normally closed clutch arrangement, the compressed gas is preferably supplied to a pneumatically controlled actuator arrangement via the valve arrangement. Hereby, the pressure level in the pneumatically controlled actuator arrangement is built up to a suitable level before controlling the normally closed clutch arrangement to be arranged in the opened position.

However, for operation in cold climates, in particularly before the vehicle engine is started, there is a risk that the pneumatically controlled actuator arrangement is unable to be sufficiently pressurized. This may be caused by the fact that sealing member(s) of the pneumatically controlled actuator arrangement is/are too cold whereby its sealing properties is not sufficient to maintain the compressed gas in the pneumatically controlled actuator arrangement.

There is thus a desire to improve the sealing properties of a pneumatically controlled actuator arrangement, preferably for vehicles operated in cold climates.

SUMMARY

It is an object of the present invention to provide a method for controlling a clutch arrangement which at least partially overcomes the above described deficiencies. This is achieved by a method according to claim 1.

According to a first aspect, there is provided a method for controlling a clutch arrangement of a vehicle transmission arranged within a gearbox housing of a vehicle, the clutch arrangement being connected to a pneumatically controlled actuator arrangement for controllably arrange the clutch arrangement between a closed position and an open position, wherein the vehicle transmission further comprises at least one rotatable transmission component configured to assume an engaged state, a disengaged state and an at least partially engaged state, wherein the method comprises the steps of determining, at a first point in time, a temperature level within the gearbox housing in the vicinity of the pneumatically controlled actuator arrangement; if the temperature level is below a predetermined threshold limit: controlling the at least one transmission component to be positioned in the at least partially engaged state for providing parts of the at least one transmission component to rotate relative to each other to increase the temperature level within the gearbox housing; providing compressed gas to the pneumatically controlled actuator arrangement; and controlling the pneumatically controlled actuator arrangement to arrange the clutch arrangement from the closed position to the opened position when a gas pressure level of the pneumatically controlled actuator arrangement is above a predetermined pressure limit.

The wording "at least partially engaged state" should be construed such that the vehicle transmission component can be positioned in a slippage state where parts of the transmission component rotate relative to each other. The parts may relate to frictional elements of the transmission component. The vehicle transmission component may, for example, relate to a clutch arrangement connecting two rotatable shafts to each other. The vehicle transmission component may also relate to a brake arrangement selectably connecting a rotatable shaft to the gearbox housing. According to a further example, the vehicle transmission component may relate to a synchronizing unit arranged to reduce a relative rotational speed of gear wheels connected to a transmission shaft of the vehicle transmission arrangement. The vehicle transmission component may preferably be a normally opened vehicle transmission component. Further description of various vehicle transmission components will be given below.

Furthermore, a temperature sensor may preferably be arranged within the gearbox housing in order to determine the temperature level in the vicinity of the pneumatically controlled actuator arrangement. Other alternatives are also conceivable, such as measuring the temperature of the oil or the air inside the vehicle transmission. Alternatively, the temperature on the gearbox housing can also be measured.

The present invention is based on the realization that an increased temperature level within the gearbox housing will improve the sealing properties of the pneumatically controlled actuator arrangement, thus improving the functions of controlling the clutch arrangement. At cold climates, there is an increased risk that the sealing will not function properly and some leakage of compressed gas may arise. An advantage is thus that the heat within the gearbox housing will be increased more rapidly in comparison to e.g. heating the inside of the gearbox housing by the excess heat from running the engine. Hereby, the pneumatically controlled actuator arrangement will be able to function more rapidly at a start-up situation, whereby the time period for operating the vehicle is substantially reduced. Friction heat is preferably provided to the inside of the gearbox housing by intermittently arranging the at least one rotatable transmission component in the partially engaged state.

According to a further advantage, the temperature level of lubricating oil within the gearbox housing will also be increased more rapidly. Hereby, beneficial lubricating properties of the lubricating oil will be obtained at an earlier point in time during take-off. An increased oil temperature will also facilitate and speed up gear changes.

According to an example embodiment, compressed gas may be provided to the pneumatically controlled actuator arrangement at a predetermined time period after the at least one transmission component has been positioned in the at least partially engaged state.

Hereby, compressed gas is not supplied to the pneumatically controlled actuator arrangement until the sealing properties of the pneumatically controlled actuator arrangement have been improved in relation to its initial condition. Compressed gas may be supplied to the pneumatically controlled actuator arrangement either after the process of heating the inside of the gearbox housing is completed, or at a point in time before such process is completed. In the latter case, initiation of supply of compressed gas to the pneumatically controlled actuator arrangement may be performed before it is determined that the sealing is fully functional.

According to an example embodiment, the predetermined time period may be based on the temperature level within the gearbox housing at the first point in time.

Hereby, the step of positioning the at least one transmission component in the at least partially engaged state may be executed for an increased duration as the temperature level inside the gearbox housing reduces.

According to an example embodiment, the step of providing compressed gas to the pneumatically controlled actuator arrangement may be preceded by the steps of determining, at a second, subsequent point in time, the temperature level within the gearbox housing in the vicinity of the pneumatically controlled actuator arrangement, and if the temperature level at the second point in time is above the predetermined threshold limit, then performing the step of providing compressed gas to the pneumatically controlled actuator arrangement.

The temperature level at the second point in time may be determined based on a signal received from a temperature sensor positioned inside the gearbox housing. Also, when the temperature level is above the predetermined threshold limit, it can be assumed that the sealing members can sufficiently prevent leakage of compressed gas, whereby the pneumatically controlled actuator arrangement can be operated as desired.

According to an example embodiment, the step of controlling the pneumatically controlled actuator arrangement to arrange the clutch arrangement from the closed position to the opened position may be preceded by the step of providing the at least one transmission component into the disengaged state.

Hereby, the at least one transmission component is here only serving the function of a frictional heating element and is thus disengaged before the clutch arrangement is arranged in the opened position.

According to an example embodiment, the clutch arrangement may be a normally closed clutch arrangement arranged in an engaged state until a gas pressure level within the actuator arrangement exceeds the predetermined pressure limit for arranging the clutch arrangement in the opened state.

As also indicated above, a normally closed clutch arrangement is arranged in a closed state until actuated by means of an actuator. Hence, when "unloaded", the normally closed clutch arrangement is arranged in the closed position. Likewise, a normally opened clutch arrangement is arranged in the opened position when "unloaded", i.e. frictional elements of a normally opened clutch arrangement are normally not in contact with each other.

According to an example embodiment, the clutch arrangement may comprise a first input clutch connected to a first input shaft of the vehicle transmission arrangement.

Hereby, the clutch arrangement is preferably controlled when operating the vehicle from a stand-still to a driving mode.

According to an example embodiment, the at least one transmission component may comprise a second input clutch connected to a second input shaft of the vehicle transmission arrangement.

The second input clutch is preferably arranged in proximity to the pneumatically controlled actuator arrangement of the first input clutch. Hereby, controlling the second input clutch to be arranged in the at least partially engaged state will relatively rapidly increase the temperature of the pneumatically controlled actuator arrangement for improving the sealing properties thereof. Also, the second input clutch may generally be arranged to transmit a relatively high torque, whereby relatively high temperature levels can be achieved when positioning the second input clutch in the at least partially engaged state. This will thus speed up heating within the gearbox housing.

According to an example embodiment, the at least one transmission component may comprise a transmission brake arranged to reduce the rotational speed of a transmission shaft. A transmission brake is normally positioned inside the gearbox housing which thus makes it suitable for heating the environment inside the gearbox housing. Also, the transmission brake is often positioned close to the pneumatically controlled actuator arrangement, whereby heating of the sealing member(s) of the pneumatically controlled actuator arrangement can be performed relatively fast.

According to an example embodiment, the transmission brake may be arranged to reduce the rotational speed of a transmission counter shaft comprising at least one gear wheel arranged in meshed connection with a gear wheel of a transmission input shaft connected to the clutch arrangement.

According to an example embodiment, the at least one transmission component may comprise a synchronizing unit arranged to reduce a relative rotational speed of rotating parts of the vehicle transmission arrangement.

A synchronizing unit is normally positioned inside the gearbox housing which thus makes it suitable for heating the environment inside the gearbox housing.

According to a second aspect, there is provided a gearbox system connected to a vehicle transmission for controlling a clutch arrangement arranged within a gearbox housing of a vehicle, the clutch arrangement being connected to a pneumatically controlled actuator arrangement for controllably arrange the clutch arrangement between a closed position and an open position, wherein the vehicle transmission further comprises at least one transmission component configured to assume an engaged state, a disengaged state and an at least partially engaged state, wherein the gearbox system comprises a control unit configured to determine, at a first point in time, a temperature level within the gearbox housing in the vicinity of the pneumatically controlled actuator arrangement; if the temperature level is below a predetermined threshold limit: control the at least one transmission component to be positioned in the at least partially engaged state for providing parts of the at least one transmission component to rotate relative to each other to increase the temperature level within the gearbox housing; transmit a control signal for providing compressed gas to the pneumatically controlled actuator arrangement; and control the pneumatically controlled actuator arrangement to arrange the clutch arrangement from the closed position to the opened position when a gas pressure level of the pneumatically controlled actuator arrangement is above a predetermined pressure limit.

The control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

Effects and features of the second aspect are largely analogous to those described above in relation to the first aspect. Thus, the control unit of the gearbox system may be arranged to operate the above described method steps, and the gearbox system may be provided with the structural features of the above described first aspect.

According to a third aspect, there is provided a computer program comprising program code means for performing the steps of any one of the embodiments described above in relation to the first aspect when the program is run on a computer.

According to a fourth aspect, there is provided a computer readable medium carrying a computer program comprising program means for performing the steps of any one of the embodiments described above in relation to the first aspect when the program means is run on a computer.

According to a fifth aspect, there is provided a vehicle comprising a vehicle transmission, the vehicle transmission comprising a clutch arrangement arranged within a gearbox housing, wherein the vehicle comprising a gearbox system according the above described second aspect.

Effects and features of the third, fourth and fifth aspects are largely analogous to those described above in relation to the first aspect.

Further features of, and advantages with, the present invention will become apparent when studying the appended claims and the following description. The skilled person will realize that different features of the present invention may be combined to create embodiments other than those described in the following, without departing from the scope of the present invention.

BRIEF DESCRIPTION OF THE DRAWINGS

The above, as well as additional objects, features and advantages of the present invention, will be better understood through the following illustrative and non-limiting detailed description of exemplary embodiments of the present invention, wherein.

DETAILED DESCRIPTION OF EXAMPLE EMBODIMENTS OF THE INVENTION

Figure 1:
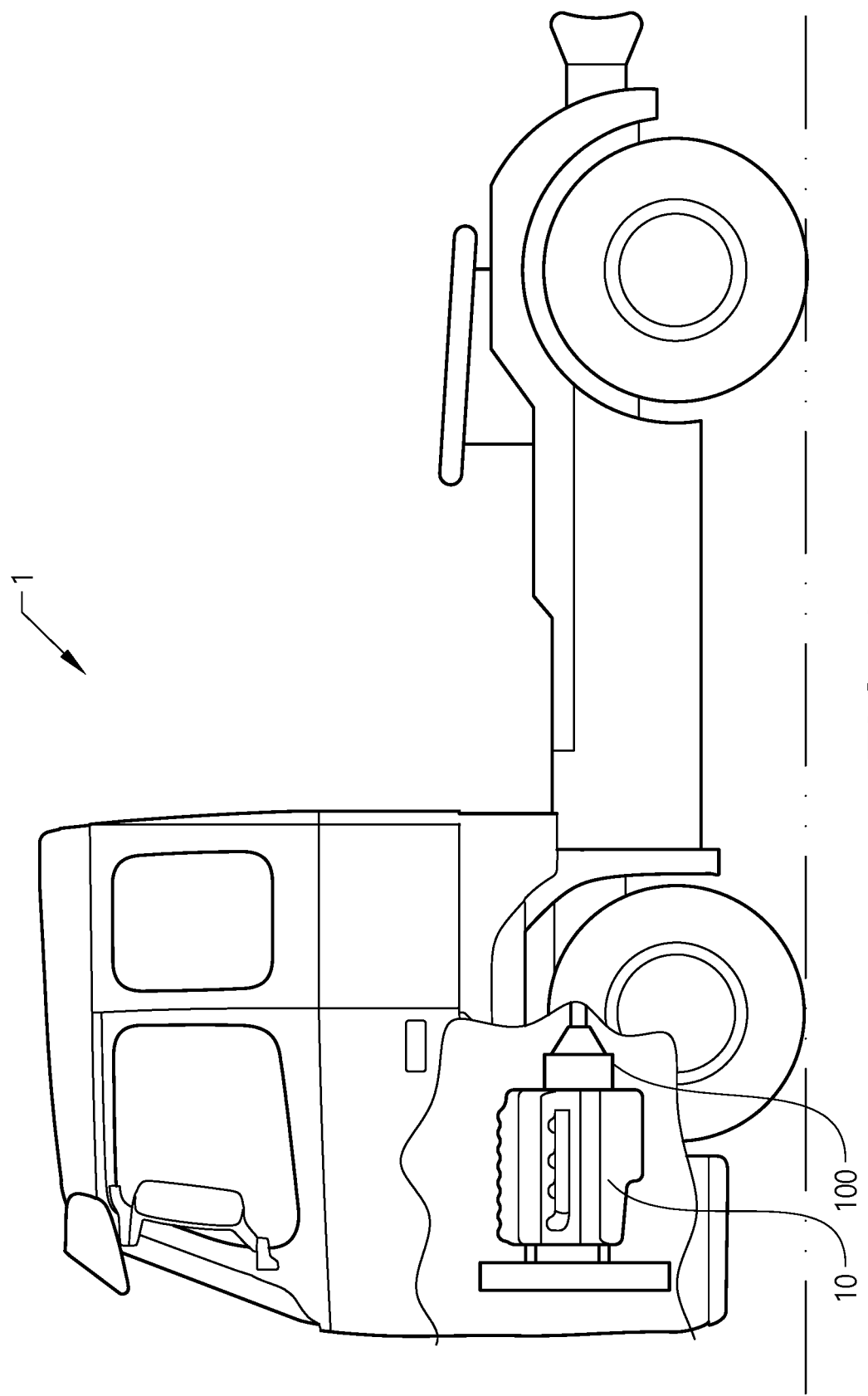
FIG. 1 is a lateral side view illustrating an example embodiment of a vehicle in the form of a truck.

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. Like reference character refer to like elements throughout the description.

With particular reference to FIG. 1, there is provided a vehicle 1 with a prime move 10 and a vehicle transmission 100 according to the present invention. The vehicle 1 depicted in FIG. 1 is a truck for which the inventive vehicle transmission 100, as will be described further below, is particularly suitable for.

Figure 2:
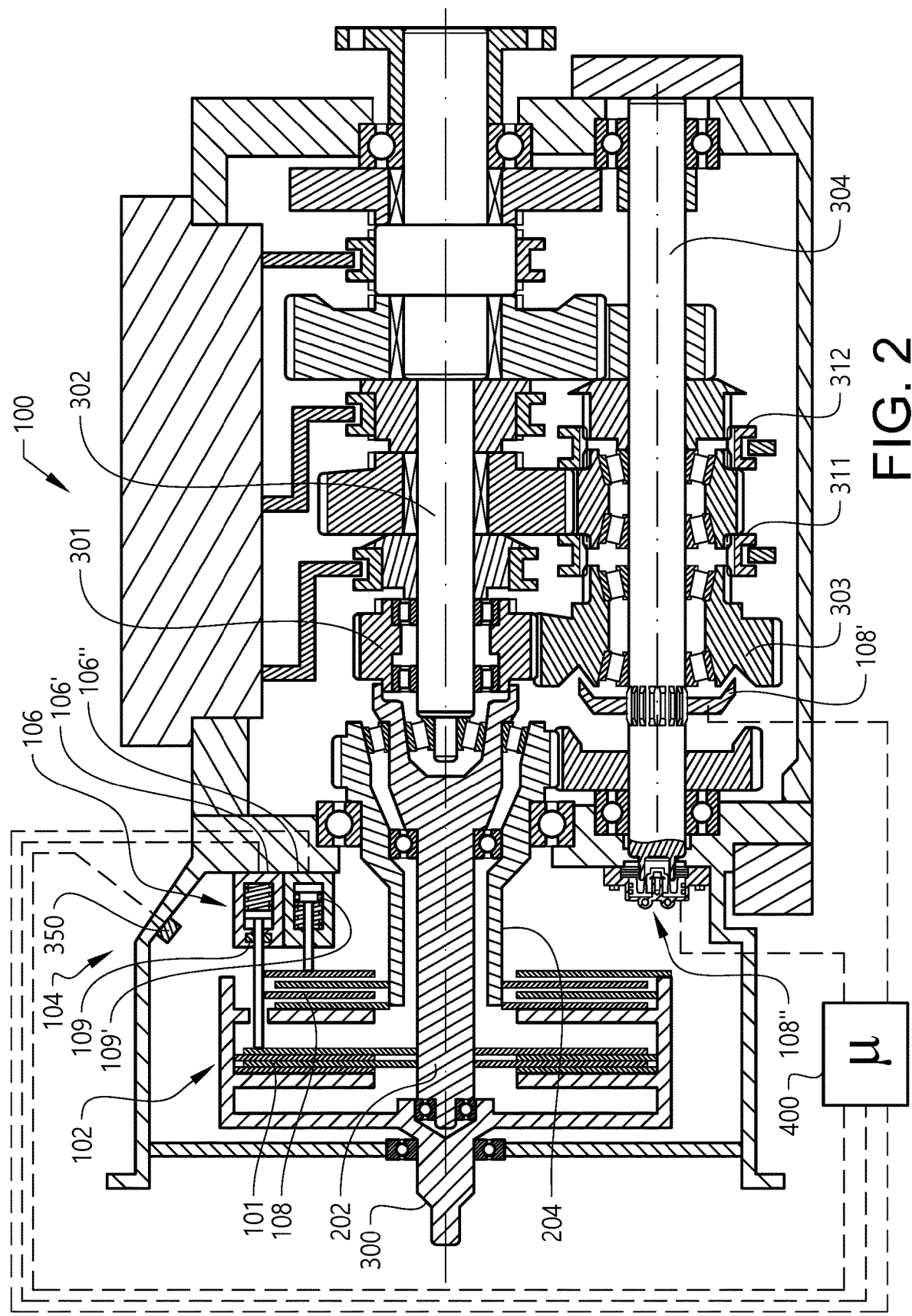
FIG. 2 is a cross-section of a vehicle transmission according to an example embodiment.

With reference to FIG. 2, the vehicle transmission 100 in FIG. 1 is depicted in further detail according to an example embodiment. As can be seen in FIG. 2, the exemplified vehicle transmission 100 comprises first input shaft 202 and a second input shaft 204, which are each connected to an output shaft 300 of the prime mover 10 (illustrated in FIG. 1) via a clutch arrangement 102. The clutch arrangement 102 comprises a first input clutch 101 and a second input clutch 108. The first input clutch 101 is arranged to connect the first input shaft 202 to the output shaft 300 of the prime mover 10 and to disconnect the first input shaft 202 from the output shaft 300 of the prime mover 10. Likewise, the second input clutch 108, also referred to as a rotatable transmission component, is arranged to connect the second input shaft 204 to the output shaft 300 of the prime mover 10 and to disconnect the second input shaft 204 from the output shaft 300 of the prime mover 10. A further description of the first and second clutch input clutches and how they are arranged to be operated will be described below.

The vehicle transmission 100 further comprises a main shaft 302, which is also the output shaft, and a counter shaft 304. Each of the main shaft 302 and counter shaft 304 comprises gear wheels which are selectively engageable to achieve a plurality of gear ratios for the vehicle transmission 100. Although not depicted in FIG. 2, the vehicle transmission also comprises a reverse shaft for obtaining reverse driving of the vehicle 1. Engagement of particular gears, and its corresponding force flow, will however not be described in further detail. Furthermore, the vehicle transmission 100 also comprises a gearbox housing 104 arranged to enclose the various parts of the vehicle transmission 100.

Moreover, the vehicle transmission 100 further comprises a rotatable transmission component in the form of a synchronizing unit 108'. The synchronizing unit 108' is arranged to synchronize a rotational speed between a gear wheel and transmission shaft before engaging the gear wheel to the specific transmission shaft. Hence, the purpose of the synchronizing unit is to reduce the relative rotational speed between the gear wheel and the transmission shaft the gear wheel is arranged upon. The synchronizing unit preferably comprises frictional elements which can be arranged in an at least partially engaged state for synchronization. In the example embodiment depicted in FIG. 2, the synchronizing unit 108' is arranged upon the counter shaft 304 and arranged to synchronize the rotational speed of a first counter shaft gear wheel 303 arranged rotatably with bearings on the counter shaft 304.

Furthermore, the vehicle transmission 100 comprises a rotatable transmission component in the form of a transmission brake 108". The transmission brake 108" is arranged to reduce the rotational speed of a transmission shaft, i.e. to brake the speed of the transmission shaft. The transmission brake 108" preferably comprises frictional elements which can be arranged in an at least partially engaged state for braking the transmission shaft. In the example embodiment depicted in FIG. 2, the transmission brake 108" is connected between the counter shaft 304 and the gearbox housing 104. Hereby, the transmission brake 108" is arranged to reduce the rotational speed of the counter shaft 304 relative to the gearbox housing 104.

As described above, the first input shaft 202 is connectable to the output shaft 300 of the prime mover 10 via the first input clutch 101 of the clutch arrangement 102, and the second input shaft 204 is connectable to the output shaft 300 of the prime mover 10 via the second input clutch 108 of the clutch arrangement 102. In order to control the first 101 and second 108 input clutches, the vehicle transmission 100 comprises a pneumatically controlled actuator arrangement 106. In the example embodiment depicted in FIG. 2, the pneumatically controlled actuator arrangement 106 is schematically illustrated for simplified understanding and comprises a first actuator 106' arranged to control the first input clutch 101, and a second actuator 106" arranged to control the second input clutch 108.

The first input clutch 101 may preferably be a so-called normally closed clutch, which means that the first input shaft 202 is connected to the output shaft 300 of the prime mover 10 until the first actuator 106' is actuated for opening the first input clutch 101. Hence, the first actuator 106', when actuated, separates the frictional elements of the first input clutch 101 from each other. This is accomplished by supplying compressed gas to the pneumatically controlled actuator arrangement 106, and when the gas pressure level within the pneumatically controlled actuator arrangement 106 is above a predetermined pressure limit, the first actuator 106' opens the first input clutch 101.

The second input clutch 108 may preferably be a so-called normally opened clutch, which means that the second input shaft 204 is disconnected from the output shaft 300 of the prime mover 10 until the second actuator 106" is actuated for closing the second input clutch 108. Hence, the second actuator 106", when actuated, connects the frictional elements of the second input clutch 108 to each other. This is accomplished by supplying compressed gas to the pneumatically controlled actuator arrangement 106, and when the gas pressure level within the pneumatically controlled actuator arrangement 106 is above a predetermined pressure limit, the second actuator 106" closes the second input clutch 108.

Both the first 106' and second 106" actuators are arranged to also position the respective first 101 and second 108 clutches in an at least partially engaged state. Hereby, the first 101 and second 108 clutches are able to slip which means that a mutual rotation between frictional elements of the respective clutches is obtained which generates heat caused by the frictional interaction between the frictional elements.

Moreover, the vehicle transmission 100 may also comprise a temperature sensor 350. Preferably, the temperature sensor 350 is positioned in the vicinity of the pneumatically controlled actuator arrangement 106, although other positions within the gearbox housing 104 are conceivable.

As further depicted in FIG. 2, the vehicle transmission 100 also comprises a control unit 400 arranged to control the operation of various components of the vehicle transmission 100. In FIG. 2, the control unit 400 is depicted as being connected to the pneumatically controlled actuator arrangement 106, the synchronizing unit 108' and to the transmission brake 108". Hence, the control unit 400 is able to control the operation of these components. It should however be readily understood that the control unit 400 may be connected to other components of the vehicle transmission 100 as well for controlling operation thereof. The control unit 400 is also connected to the temperature sensor 350 for receiving temperature values therefrom.

When supplying compressed gas to the pneumatically controlled actuator arrangement 106, it is important that sealing members, in FIG. 2 schematically illustrated with numerals 109 and 109', of the pneumatically controlled actuator arrangement 106 provides sufficient seal as to be able to build up the gas pressure to a level above the predetermined gas pressure limit within the pneumatically controlled actuator arrangement 106.

When the vehicle 1 is operated in cold climates, and before the prime mover 10 has been started up for take-off, the temperature level of the vehicle transmission 100, and in particular the temperature level within the gearbox housing 104 of the vehicle transmission 100 may be relatively low. Not only is the lubricating properties of the lubricating oil within the gearbox housing deteriorated by this low temperature, but also the sealing members 109, 109' may not function as desired. Hence, the sealing members 109, 109' may not, due to the low temperature, sufficiently maintain and build up the gas pressure within the pneumatically controlled actuator arrangement 106. This may result in that e.g. the first actuator 106' is unable to open the first input clutch 101 for disconnecting the first input shaft 202 from the output shaft 300 of the prime mover 10.

Before the vehicle 1 is about to take off, i.e. before the prime mover 10 is started, the first input clutch 101 is closed while the second input clutch 108 is opened. Hereby, the first input shaft 202 is connected to the output shaft 300 of the prime mover 10. Hence, the first input shaft 202 rotates with the output shaft 300 of the prime mover 10. When the vehicle 1 is to take off and drive away from its current position, the vehicle transmission 100 as exemplified in FIG. 2 should disengage the first input shaft 202 from the output shaft 300 of the prime mover 10, i.e. open the first input clutch 101. However, and as described above, the low temperature may negatively affect the sealing members 109 of the first actuator such that sufficient gas pressure cannot be obtained for disengaging the first input clutch 101 as desired.

There is thus a desire to increase the temperature level within the gearbox housing 104 for improving the sealing properties of the sealing members 109, 109' to a faster extent. This may be achieved in a number of ways which will now be described below.

According to a first example, the temperature level may be increased by positioning the second input clutch 108 in an at least partially engaged state. The second input clutch 108, which is a normally opened clutch, requires a lower pressure level to be positioned in the at least partially engaged state in comparison to the pressure level for positioning the first, normally closed clutch 101 in the opened state. Hereby, the second input clutch 108 can suitably be used as a heating element at low temperatures. Heat will thus be generated due to the friction caused by the mutual rotation between the frictional elements of the second input clutch 108. As the pneumatically controlled actuator arrangement 106 is positioned in the vicinity of the second input clutch 108, the sealing members 109, 109' may be efficiently warmed up relatively rapidly. Also, the second input clutch 108 may be intermittently positioned in the at least partially engaged state, such that a pulsating generation of heat is provided. When the temperature level within the gearbox housing has reached a predetermined temperature level at which a sufficient gas pressure can be build up within the pneumatically controlled actuator arrangement 106, the second input clutch 108 is disengaged, where after the first actuator 106' controls the first input clutch 101 to be arranged in the disengaged state.

According to an example embodiment which can be used as an alternative or in combination with the above described embodiment, heat may be generated within the gearbox housing 104 by positioning the synchronizing unit 108' in an at least partially engaged state before take off. As stated above, the first input shaft 202 is connected to the output shaft 300 of the prime mover 10. As the first input shaft 202 is connected to a first main shaft gear wheel 301, which in turn is arranged in meshed connection with the first counter shaft gear wheel 303, the first counter shaft gear wheel 303 will also rotate when the first input shaft 202 rotates. For achieving a relative rotational speed between the first counter shaft gear wheel 303 and the counter shaft 304, one of the engaging sleeves 311 and 312 should be disengaged. Hereby, the synchronizing unit 108' and a friction surface of the first counter shaft gear wheel 303 can be arranged in an at least partially engaged position for generating frictional heat within the gearbox housing 104. The counter shaft 304 will be driven by the synchronizing unit 108' but braked by a viscous damping force as a result of the synchronizing unit 108' being at least partially submerged in relatively cold and viscous oil within the gear box housing. Hereby, the "slipping effect" of the synchronizing unit 108' can be generated.

According to a further example embodiment which can be used as an alternative or in combination with any one of the above described embodiments, heat may be generated within the gearbox housing 104 by positioning the transmission brake 108" in the at least partially engaged state before take off. When the first input shaft 202 rotates, the counter shaft 304 will also rotate since it is rotationally connected to the first counter shaft gear wheel 303 by means of, for example, tooth clutches.

Hereby, the transmission brake 108", which is a normally opened transmission brake, can be arranged to be positioned in the at least partially engaged state for generating heat within the gearbox housing 104. When using the transmission brake 108" for increasing the temperature level within the gear box housing of the example depicted in FIG. 2, both engaging sleeves 311 and 312 should be engaged for connecting counter shaft 304 to the first input shaft 202.

Controlling any of the second input clutch 108, the synchronizing unit 108' and the transmission brake 108" to be positioned in the at least partially engaged state is preferably executed by the control unit 400.

Figure 3:
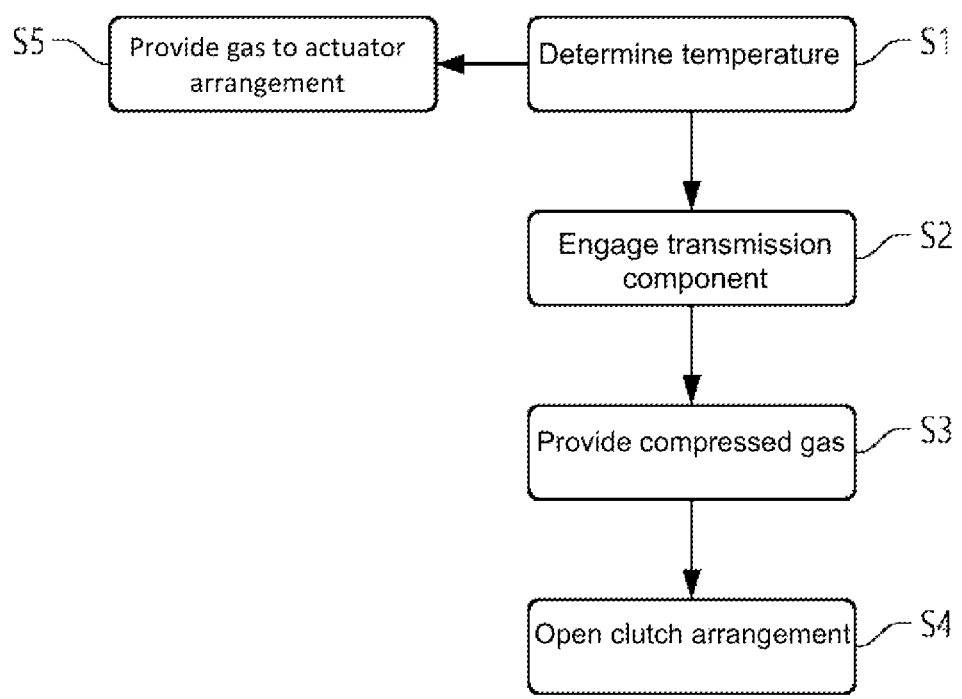
FIG. 3 is a flow chart of a method for controlling a clutch arrangement according to an example embodiment.

In order to sum up, reference is made to FIG. 3 which illustrates a flow chart of a method for controlling a clutch arrangement according to an example embodiment. Firstly, and before the vehicle 1 is about to take off, the temperature level within the gearbox housing 104 in the vicinity of the pneumatically controlled actuator arrangement 106 is determined S1. This may be determined by means of the above described temperature sensor 350 which is positioned within the gearbox housing 104 and connected to the control unit 400. If the temperature level is above a predetermined threshold limit, the vehicle transmission 100 is operated according to normal proceedings, i.e. compressed gas is provided S5 to the pneumatically controlled actuator arrangement 106 for operation thereof.

However, if the temperature level is below the predetermined threshold limit, at least one of the above described rotatable transmission components 108, 108', 108" is controlled S2 to be positioned in the at least partially engaged state. Hence, at least one of the second input clutch 108, the synchronizing unit 108' and/or the transmission brake 108" is at least partially engaged for generating heat within the gearbox housing 104.

Thereafter, compressed gas is provided S3 to the pneumatically controlled actuator arrangement 106, preferably at a time period after the step of positioning the at least one transmission component in the at least partially engaged state. When the gas pressure level of the pneumatically controlled actuator arrangement 106 is above a predetermined pressure limit, the pneumatically controlled actuator arrangement 106 is controlled S4 to arrange the clutch arrangement from the closed position to the opened position.

It is to be understood that the present invention is not limited to the embodiments described above and illustrated in the drawings; rather, the skilled person will recognize that many changes and modifications may be made within the scope of the appended claims. Although FIG. 2 illustrates the vehicle transmission 100 comprising two input clutches and two input shafts, it should be readily understood that the invention is equally applicable for a single input clutch transmission.

The invention claimed is:

1. A method for controlling a clutch arrangement of a vehicle transmission arranged within a gearbox housing of a vehicle, the clutch arrangement being connected to a pneumatically controlled actuator arrangement for controllably arrange the clutch arrangement between a closed position and an open position, wherein the vehicle transmission further comprises at least one rotatable transmission component configured to assume an engaged state, a disengaged state and an at least partially engaged state, the method comprising the steps of:
   determining, at a first point in time, a temperature level within the gearbox housing in the vicinity of the pneumatically controlled actuator arrangement;
   when the temperature level is below a predetermined threshold limit:
   controlling the at least one transmission component to be positioned in the at least partially engaged state for providing parts of the at least one transmission component to rotate relative to each other to increase the temperature level within the gearbox housing;
   providing compressed gas to the pneumatically controlled actuator arrangement; and
   controlling the pneumatically controlled actuator arrangement to arrange the clutch arrangement from the closed position to the opened position when a gas pressure level of the pneumatically controlled actuator arrangement is above a predetermined pressure limit.

2. The method according to claim 1, wherein compressed gas is provided to the pneumatically controlled actuator arrangement at a predetermined time period after the at least one transmission component has been positioned in the at least partially engaged state.

3. The method according to claim 2, wherein the predetermined time period is based on the temperature level within the gearbox housing at the first point in time.

4. The method according to claim 1, wherein the step of providing compressed gas to the pneumatically controlled actuator arrangement is preceded by the steps of:

determining, at a second, subsequent point in time, the temperature level within the gearbox housing in the vicinity of the pneumatically controlled actuator arrangement, and when the temperature level at the second point in time is above the predetermined threshold limit, then:

performing the step of providing compressed gas to the pneumatically controlled actuator arrangement.

5. The method according to any claim 1, wherein the step of controlling the pneumatically controlled actuator arrangement to arrange the clutch arrangement from the closed position to the opened position is preceded by the step of:

providing the at least one transmission component into the disengaged state.

6. The method according to claim 1, wherein the clutch arrangement is a normally closed clutch arrangement arranged in an engaged state until a gas pressure level within the actuator arrangement exceeds the predetermined pressure limit for arranging the clutch arrangement in the opened state.

7. The method according to claim 1, wherein the clutch arrangement comprises a first input clutch connected to a first input shaft of the vehicle transmission arrangement.

8. The method according to claim 7, wherein the at least one transmission component comprises a second input clutch connected to a second input shaft of the vehicle transmission arrangement.

9. The method according to claim 1, wherein the at least one transmission component comprises a transmission brake arranged to reduce the rotational speed of a transmission shaft.

10. The method according to claim 9, wherein the transmission brake is arranged to reduce the rotational speed of a transmission counter shaft comprising at least one gear wheel arranged in meshed connection with a gear wheel of a transmission input shaft connected to the clutch arrangement.

11. The method according to claim 1, wherein the at least one transmission component comprises a synchronizing unit arranged to reduce a relative rotational speed of rotating parts of the vehicle transmission arrangement.

12. A gearbox system connected to a vehicle transmission for controlling a clutch arrangement arranged within a gearbox housing of a vehicle, the clutch arrangement being connected to a pneumatically controlled actuator arrangement for controllably arrange the clutch arrangement between a closed position and an open position, wherein the vehicle transmission further comprises at least one transmission component configured to assume an engaged state, a disengaged state and an at least partially engaged state, wherein the gearbox system comprises a control unit configured to:

determine, at a first point in time, a temperature level within the gearbox housing in the vicinity of the pneumatically controlled actuator arrangement; when the temperature level is below a predetermined threshold limit:

control the at least one transmission component to be positioned in the at least partially engaged state for providing parts of the at least one transmission component to rotate relative to each other to increase the temperature level within the gearbox housing;

transmit a control signal for providing compressed gas to the pneumatically controlled actuator arrangement; and control the pneumatically controlled actuator arrangement to arrange the clutch arrangement from the closed position to the opened position when a gas pressure level of the pneumatically controlled actuator arrangement is above a predetermined pressure limit.

13. A vehicle comprising a vehicle transmission, the vehicle transmission comprising a clutch arrangement arranged within a gearbox housing, wherein the vehicle comprising a gearbox system according to claim 12.

* * * * *